US005465911A

United States Patent [19]
Hall

[11] Patent Number: 5,465,911
[45] Date of Patent: Nov. 14, 1995

[54] ANGLED TERMINAL/COIL DESIGN FOR SMALL DIAMETER FUEL INJECTOR

[75] Inventor: Bryan C. Hall, Newport News, Va.

[73] Assignee: Siemens Automotive L.P., Auburn Hills, Mich.

[21] Appl. No.: 292,460

[22] Filed: Aug. 18, 1994

[51] Int. Cl.$^6$ .................................................... F16K 31/06

[52] U.S. Cl. .................................... 239/585.4; 239/585.1; 251/129.21; 336/192; 336/107

[58] Field of Search .............................. 239/585.1–585.5; 336/192, 107; 251/129.21, 129.18, 129.15

[56] References Cited

U.S. PATENT DOCUMENTS

| | | | |
|---|---|---|---|
| 4,974,780 | 12/1990 | Nakamura et al. | 239/585.5 X |
| 5,289,627 | 3/1994 | Cerny et al. | 239/585.5 X |
| 5,341,994 | 8/1994 | Wakeman | 239/585.5 X |
| 5,358,181 | 10/1994 | Toni et al. | 239/585.5 X |

FOREIGN PATENT DOCUMENTS

| | | | |
|---|---|---|---|
| 58-15758 | 1/1983 | Japan | 239/585.5 |

*Primary Examiner*—Andres Kashnikow
*Assistant Examiner*—Lesley D. Morris
*Attorney, Agent, or Firm*—Russel C. Wells

[57] ABSTRACT

When the overall diameter of a solenoid-operated fuel injector is reduced, sections of a pair of electric terminals that are circumferentially spaced apart about, and embedded in an end wall of a bobbin of, an electromagnetic coil assembly of the fuel injector are disposed such that their rectangular transverse cross sections are disposed at an angled relation to each other to provide greater clearance to any electrically conductive parts of the fuel injector in the immediate vicinity. Other sections of the terminals that form blades of standard-sized rectangular transverse cross section for connection to terminals of a mating connector leading to an electric control circuit for operating the fuel injector are in non-angled relationship so that the mating connector and its component parts can remain of standardized dimensions.

17 Claims, 2 Drawing Sheets

(PRIOR INJECTOR)

(PRIOR INJECTOR)

ANGLED TERMINAL/COIL DESIGN FOR SMALL DIAMETER FUEL INJECTOR

FIELD OF THE INVENTION

This invention relates to solenoid operated fuel injectors that are used in fuel injection systems of internal combustion engines.

BACKGROUND AND SUMMARY OF THE INVENTION

One means for reducing the overall diameter of a fuel injector comprises using hermetic laser welds instead of O-ring seals at certain internal joints. This allows certain individual parts to be of smaller diameters.

Since the diameter of the fuel inlet tube of a top-feed fuel injector is sized for use with a particular standard-sized O-ring seal that seals the fuel inlet tube to a cup, or socket, of a fuel rail, a reduction in its diameter is apt not to be cost effective since a non-standard-sized O-ring would have to be tooled for it. A reduction in the overall diameter of the electromagnetic coil assembly can be accomplished albeit at the expense of a modest non-objectionable increase in overall length for the coil assembly in order to maintain fuel injector performance. The fuel inlet tube still passes into a central through-hole of the fuel injector's electromagnetic coil assembly.

The electromagnetic coil assembly of a typical fuel injector has a pair of formed metal electrical terminals via which it electrically connects with an electric control circuit for selectively energizing the assembly's electromagnetic coil to operate the fuel injector. These terminals have standardized blade sizes, and costwise it may be preferable to maintain these standardized blade sizes in a reduced diameter electromagnetic coil assembly. Each terminal typically mounts on an end wall of a non-ferromagnetic bobbin (plastic, typically) on which the electromagnetic coil is disposed and which contains the central through-hole into which the fuel inlet tube passes. The terminals are circumferentially spaced apart. One end of each terminal is electrically joined to a respective termination of the wire that is wound on the bobbin to form the electromagnetic coil and that end of the terminal is embedded in the bobbin end wall while the remainder of the terminal, including a standard-sized blade at the opposite end, is exposed. These exposed blades are disposed spaced apart, parallel and side-by-side, within a surround portion of the fuel injector's non-metallic plastic overmold cover, to form an electrical connector plug adapted for mating engagement with a mating connector containing the mating terminals that lead to the electric control circuit for operating the fuel injector.

Each terminal is of uniform thickness and of rectangular transverse cross section throughout its length, although the width may differ in different sections along the length. Not only are the sections of the terminals that are embedded in the bobbin end wall circumferentially spaced apart about the bobbin through-hole and the portion of the fuel inlet tube that is disposed coaxially therein, but their flat widthwise surfaces that generally face the fuel inlet tube are disposed in a common imaginary plane.

The present invention relates to a novel construction for these terminals for better accommodation with a reduced diameter electromagnetic coil assembly. The invention arises from the observation that when the diameter of the electromagnetic coil assembly is reduced, there is also reduced clearance between the terminals and one or more electrically conductive parts that are in the vicinity of the electric terminals of the coil assembly, for example clearance to a metal housing that is disposed over the coil assembly to form a portion of a stator structure that is associated with the coil assembly.

The invention places those portions of the terminals that are embedded in the bobbin end wall at an angled relationship to each other such that their flat, planar, widthwise surfaces that face the fuel inlet tube are disposed in respective non-parallel planes. Such orientation increases clearance of the terminals to any proximate electrically conductive part, or parts, when compared with a prior fuel injector using the same sized and shaped parts except for the widthwise surfaces that face the fuel inlet tube being in a common plane in the prior fuel injector. Thus, one of the advantages of the invention resides in reducing the risk of shorting a terminal to a nearby electrically conductive part of a reduced diameter fuel injector. Yet, the exposed blades that are to mate with respective mating terminals of the mating connector that leads to the electric control circuit, remain disposed spaced apart, parallel and side-by-side within the non-metallic surround so that the mating connector and its terminals can continue to be of standardized dimensions throughout, and thus avoiding the necessity of re-tooling those parts to accommodate the new fuel injector terminal configuration.

Various features, advantages and the inventive aspects will be seen in the ensuing description and claims which are accompanied by drawings that disclose a presently preferred exemplary embodiment of the invention according to the best mode contemplated at the present time for carrying out the invention.

DESCRIPTION OF THE PREFERRED EMBODIMENT

Figure 1:
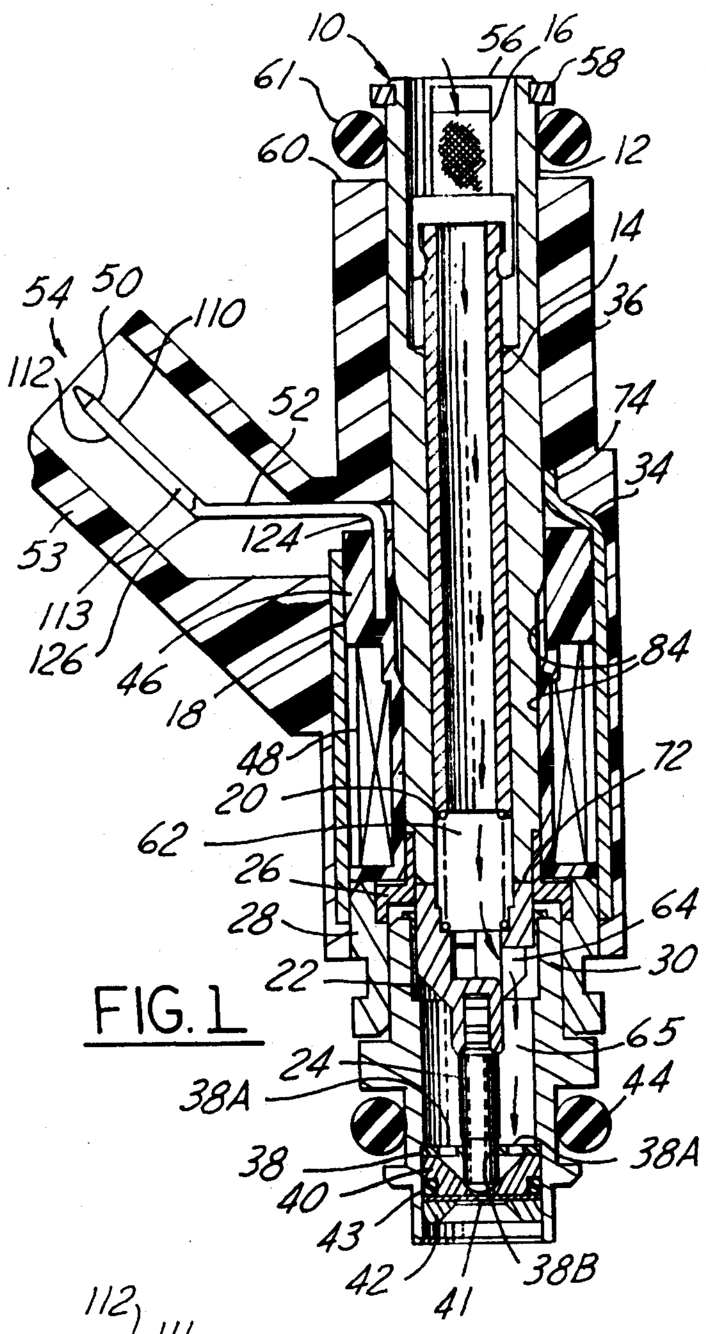
FIG. 1 is a longitudinal cross-sectional view through an exemplary fuel injector embodying principles of the present invention.

FIG. 1 shows an exemplary fuel injector 10 comprising a number of parts including a fuel inlet tube 12, an adjustment tube 14, a filter assembly 16, an electromagnetic coil assembly 18, a coil spring 20, an armature 22, a needle valve 24, a non-magnetic shell 26, a valve body shell 28, a valve body 30, a coil assembly housing 34, a non-metallic cover 36, a needle guide member 38, a valve seat member 40, a thin disk orifice member 41, a backup retainer member 42, a small O-ring seal 43, and a large O-ring seal 44.

Parts 38, 40, 41, 42, and 43 form a stack that is disposed at the nozzle end of fuel injector 10, as shown in a number of commonly assigned patents, such as U.S. Pat. No. 5,174, 505. Armature 22 and needle valve 24 are joined together to form an armature/needle subassembly. Coil assembly 18 comprises a plastic bobbin 46 on which an electromagnetic coil 48 is wound. Respective terminations of coil 48 connect to respective terminals 50, 52 that are shaped and, in cooperation with a surround 53 formed as an integral part of cover 36, to form an electric connector 54 for connecting the fuel injector to an electric control circuit (not shown) that operates the fuel injector.

Fuel inlet tube 12 is ferromagnetic and comprises a fuel inlet opening 56 at the exposed upper end. A ring 58 that is disposed around the outside of fuel inlet tube 12 just below fuel inlet opening 56 cooperates with an end surface 60 of cover 36 and the intervening O.D. of tube 12 to form a groove for an O-ring seal 61 that is typically used to seal the fuel injector inlet to a cup, or socket, in an associated fuel rail (not shown). The lower O-ring 44 is for providing a fluid-tight seal with a port in an engine induction intake system (not shown) when the fuel injector is installed on an engine. Filter assembly 16 is fitted to the open upper end of adjustment tube 14 in conventional manner to filter any particulate material larger than a certain size from fuel entering through inlet opening 56 before the fuel enters adjustment tube 14.

In the calibrated fuel injector, adjustment tube 14 has been pressed axially to an axial position within fuel inlet tube 12 that compresses spring 20 to a desired bias force that urges the armature/needle such that the rounded tip end of needle valve 24 is seated on valve seat member 40 to close the central hole through the valve seat. Preferably, tubes 14 and 12 are crimped together to maintain their relative axial positioning after adjustment calibration has been performed.

After passing through adjustment tube 14, fuel enters a space 62 that is cooperatively defined by confronting ends of inlet tube 12 and armature 22 and that contains spring 20. Armature 22 comprises a passageway 64 that communicates space 62 with a passageway 65 in valve body 30, and guide member 38 contains fuel passage holes 38A whereby fuel can flow from space 62 to valve seat member 40. This fuel flow path is indicated by the succession of arrows in FIG. 1.

The upper end of non-ferromagnetic shell 26 is telescopically fitted on and joined to the lower end of inlet tube 12, preferably by laser welding. Valve body shell 28 is ferromagnetic and its upper end is joined in fluid-tight manner to the lower end of non-ferromagnetic shell 26, preferably by laser welding.

The upper end of valve body 30 fits closely inside the lower end of valve body shell 28 and these two parts are joined together in fluid-tight manner, preferably by laser welding. Armature 22 is guided for axial reciprocation by means on the inside wall structure of the fuel injector, including guidance of needle valve 24 by a central guide hole 38B in member 38 through which needle valve 24 passes.

In the closed position shown in FIG. 1, a small working gap 72 exists between fuel inlet tube 12 and armature 22. Coil housing 34 and tube 12 are in contact at 74 and constitute a stator structure that is associated with coil assembly 18. Non-ferromagnetic shell 26 assures that when coil 48 is energized, the magnetic flux will follow a path that includes armature 22. Starting at the lower axial end of housing 34, the magnetic circuit extends through valve body shell 28 and valve body 30 to armature 22, and from armature 22 across working gap 72 to inlet tube 12. When coil 48 is energized, the spring force on armature 22 is overcome and the armature is attracted toward inlet tube 12 reducing working gap 72. This unseats needle valve 24 from valve seat member 40 to open the fuel injector so fuel is now injected from the injector's nozzle. When the coil ceases to be energized, spring 20 pushes the armature/needle closed on valve seat member 40.

Bobbin 46 comprises a central through-hole 84 whose upper portion has a larger diameter than its lower portion to provide for the lower end of tube 12 (whose lower portion has a smaller O.D. than its upper portion) to be inserted into the upper end of through-hole 84 when coil assembly 18 is being assembled to inlet tube 12. The tube is inserted to an extent that allows its lower end to protrude from the lower end of through-hole 84 so that shell 26 can be welded to the lower end of tube 12. After that, coil assembly 18 is slid down tube 12 to assume the position in FIG. 1, which is its final position. During this time, terminals 50, 52 are straight (FIG. 2), having not yet been formed to their final shapes. Coil assembly 18 is kept in this final position by placing housing 34 over the parts as they appear in FIG. 1 and welding it in place as at 74 for example. As can be seen in FIG. 1, the upper end of housing 34 is shaped to axially trap coil assembly 18 against a shoulder of shell 26. The fuel injector is thereafter completed by further assembly process steps, including steps relating to terminals 50, 52.

Figure 2:
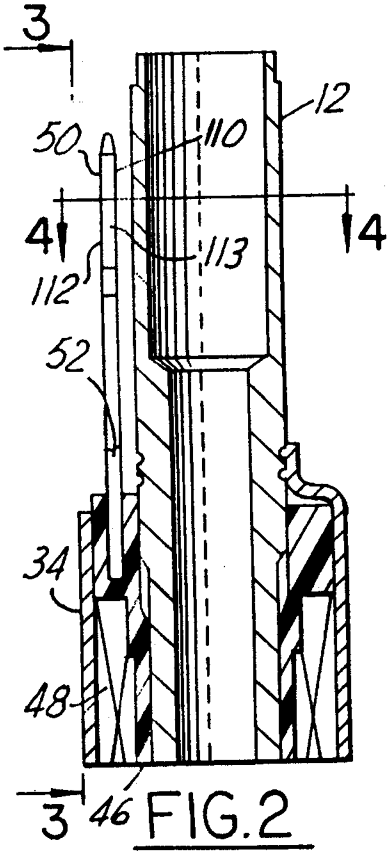
FIG. 2 is fragmentary view of a portion of FIG. 1 as it appears at a stage during the fabrication process.
Figure 3:
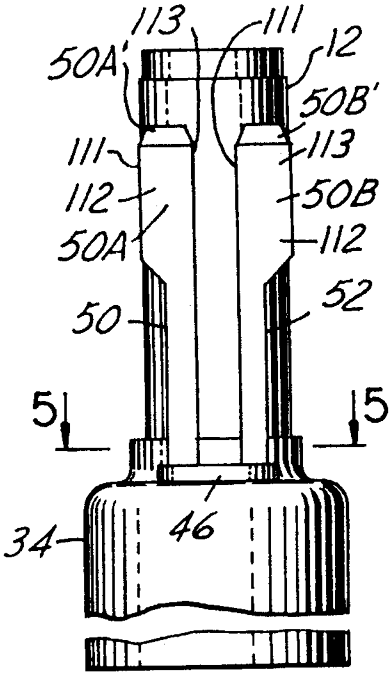
FIG. 3 is a left side elevational view of FIG. 2 in the direction of arrows 3—3 in FIG. 2.
Figure 4:
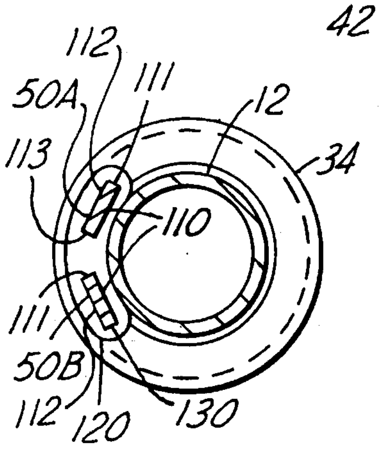
FIG. 4 is a full transverse cross sectional view in the direction of arrows 4—4 in FIG. 3.

In the unfinished condition shown in FIGS. 2 and 3, terminals 50, 52 are substantially identical in size, shape, and material. They differ only in their circumferential locations on the fuel injector, and in being disposed in mirror image fashion on the fuel injector, as shown in FIG. 3. One end of each terminal is embedded in the end wall of bobbin 46 and electrically joined to a corresponding termination of the wire that forms coil 48. Each terminal is of uniform thickness and has a transverse cross section of rectangular shape throughout its length, although the width may vary at different locations along its length. As shown in FIG. 3, the width is enlarged at the end opposite the bobbin-embedded end to form a respective blade 50A, 50B of standardized dimensions. Each distal blade end is shaped to provide the usual lead 50A', 50B' to facilitate initial engagement with the respective mating terminal of the mating connector that leads to the electric control circuit. In the finished condition of FIG. 1, blades 50A, 50B are disposed spaced apart, parallel and side-by-side within nonmetallic surround 53 so that the mating connector and its terminals can continue to be of standardized size and shape. The rectangular cross section of each blade 50A, 50B provides four flat planar surfaces 110, 111, 112, 113. When the terminals are formed from the shapes shown in FIGS. 2 and 3 to those shown in FIG. 1, surfaces 110 of both blades will finally be disposed in a common imaginary plane, and surfaces 112 of both blades in another common imaginary plane parallel to the plane occupied by surfaces 110. Surfaces 111, 113 will be disposed in spaced apart parallel planes that intersect the planes occupied by surfaces 110, 112 at right angles, with surface 113 of blade 50A disposed in juxtaposition to surface 111 of blade 50B so that the two directly confront each other across the intervening space between them. In the finished fuel injector in FIG. 1, the lengths of blades 50A, 50B are non-parallel to the lengths of the bobbin-embedded ends of their respective terminals.

Figure 5:
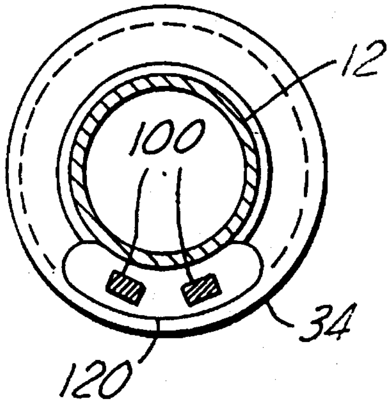
FIG. 5 is a full transverse cross sectional view in the direction of arrows 5—5 in FIG. 3.
Figure 6:
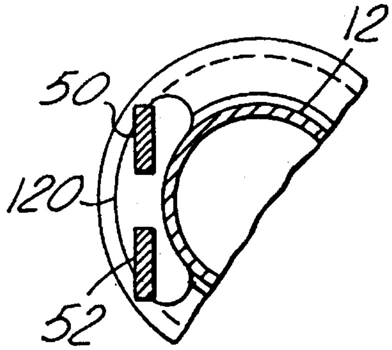
FIG. 6 is a view similar to FIG. 4 to illustrate a portion of electrical terminals of a prior fuel injector.
Figure 7:
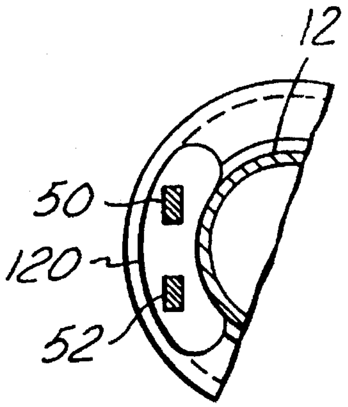
FIG. 7 is a view similar to FIG. 5 to illustrate another portion of the electrical terminals of the prior fuel injector.

The bobbin-embedded end of each terminal is arranged differently from the prior arrangement that is portrayed by FIGS. 6 and 7. FIG. 7 shows that the sections of the terminals that are embedded in the bobbin end wall are circumferentially spaced apart about bobbin through-hole 84 and the portion of fuel inlet tube 12 that is disposed coaxially therein, but that they have their flat widthwise surfaces that generally face fuel inlet tube 12 disposed in a common imaginary plane. For a given housing cover 34, this orientation will provide less clearance to the cover than terminals arranged in accordance with the present invention, as shown by FIG. 5.

As shown by FIGS. 1–5, the embedded portion of each terminal 50, 52 extends from coil 48 generally parallel to, and spaced slightly radially outwardly of, the circular cylindrical side wall of fuel inlet tube 12. Each of these embedded portions has four surfaces 100, 101, 102, 103 forming the rectangular transverse cross-sectional shape. Each surface 100 is a flat planar one that faces, and extends lengthwise parallel to, the circular cylindrical side wall of fuel inlet tube 12. Surfaces 100 are disposed in respective imaginary planes that intersect each other at a location that is circumferentially between them and further radially outwardly from the circular cylindrical side wall of fuel inlet tube 12 than any portion of either surface 100. Stated another way, surfaces 100 are disposed in respective imaginary planes each of which faces, and is parallel to, a respective diameter of the circular cylindrical side wall of fuel inlet tube 12, such respective diameters intersecting at an acute angle. Stated still another way with respect to the condition shown in FIGS. 2 and 3, surface 110 of each blade 50A, 50B is disposed in a respective imaginary plane that is parallel to the length of inlet tube 12 and that is perpendicular to a respective imaginary plane that both passes diametrically through tube 12 and also bisects the width of the respective blade 50A, 50B.

By orienting their bobbin-embedded portions in this way, the terminals have greater clearance to a slot 120 in housing 34 than if oriented in the prior manner of FIG. 7. This is important, not only in the finished fuel injector, but also during the injector fabrication process since greater clearance is provided as housing 34 is being placed over the coil assembly while the terminals are still straight, and this reduces the likelihood of scraping plating material off the terminals that could wind up as internal contamination.

In order to form the terminals from the position of FIGS. 2 and 3 to the final position of FIG. 1, not only will each be bent at the locations indicated by 124 and 126, but each will have a slight twist in the section between its bends 124, 126, such twisting of each being done in the opposite sense from the twisting of the other as viewed along the length of the section between its bends 124, 126. After the terminals have been formed to the final shapes of FIG. 1, cover 36, including surround 53, can be injection molded around the assembled parts.

While a presently preferred embodiment of the invention has been illustrated and described, it is to be appreciated that principles of the invention apply to all equivalent constructions that fall within the scope of the following claims.

What is claimed is:

1. An electrically operated fuel injector for injecting fuel into an internal combustion engine comprising a fuel inlet via which fuel enters the fuel injector, a nozzle via which fuel is injected from the injector, an internal passage within said fuel injector for conveying fuel from said fuel inlet to said nozzle, a mechanism comprising a solenoid-operated valve for selectively opening and closing said internal passage in accordance with selective energizing of an electromagnetic coil of an electromagnetic coil assembly that, in addition to said coil, comprises a pair of electrical terminals that form terminations for said coil and are spaced circumferentially from each other about said coil assembly, said stator comprising a circular cylindrical side wall disposed in a central through-hole in said electromagnetic coil assembly, each of said pair of terminals being a length of formed metal having a first section of its length extending from said coil generally parallel to said circular cylindrical side wall of said stator and spaced slightly radially outwardly of said circular cylindrical side wall of said stator, each of said first sections of said terminals having a transverse cross section of a shape that provides each of said first sections with a flat planar surface that faces, and extends lengthwise parallel with, said circular cylindrical side wall of said stator, each of said pair of terminals further having a second section of its length spaced from its respective first section and adapted for making contact with a respective mating terminal for connecting the fuel injector to a control circuit for selectively energizing said coil, wherein said surfaces of said first sections of said terminals that face said circular cylindrical side wall of said stator are disposed in respective imaginary planes that intersect each other at a location that is circumferentially between them and further radially outwardly from said circular cylindrical side wall of said stator than any portion of either of said flat planar surfaces of said first sections of said terminals.

2. A fuel injector as set forth in claim 1 wherein said transverse cross section of each of said first sections of said terminals is rectangular in shape so that each first section of each terminal has, in addition to said surface thereof that faces said circular cylindrical side wall of said stator, three additional surfaces.

3. A fuel injector as set forth in claim 2 wherein said second section of each terminal has a transverse cross section that is rectangular in shape so as to have four flat planar surfaces, and said second sections of said terminals are arranged relative to each other such that a first of said four flat planar surfaces of said second section of one of said terminals is disposed spaced from, and in parallel confrontational relationship to, a first of said four flat planar surfaces of said second section of the other of said terminals.

4. A fuel injector as set forth in claim 3 wherein said second sections are identical but disposed in mirror-image fashion about an imaginary plane passing diametrically through the stator and between the two terminals.

5. A fuel injector as set forth in claim 4 wherein the transverse cross sections of said first sections of said terminals have identical widths and identical thicknesses.

6. A fuel injector as set forth in claim 5 wherein the widths of the transverse cross sections of said second sections of said terminals are larger than the widths of the transverse cross sections of said first sections of said terminals.

7. A fuel injector as set forth in claim 1 wherein said second sections of said terminals have a transverse cross section of a shape that provides each of said second sections with a flat planar surface, and said second sections of said terminals are arranged such that said flat planar surface of said second section of one of said terminals and said flat planar surface of said second section of the other of said terminals lie in a common imaginary plane.

8. A fuel injector as set forth in claim 1 wherein said second sections of said terminals have a transverse cross section of a shape that provides each of said second sections with a flat planar surface, and said second sections of said terminals are arranged such that said flat planar surface of said second section of one of said terminals and said flat planar surface of said second section of the other of said terminals lie in imaginary planes that intersect each other at a right angle.

9. A fuel injector as set forth in claim 1 wherein said second sections of said terminals have a transverse cross section of a shape that provides each of said second sections with a flat planar surface, and said second sections of said terminals are arranged such that said flat planar surface of said second section of one of said terminals and said flat planar surface of said second section of the other of said terminals confront each other and lie in respective imaginary parallel planes.

10. A fuel injector as set forth in claim 9 wherein said transverse cross section of each of said second sections of said terminals is rectangular in shape so that each second section of each terminal has, in addition to the already-mentioned flat planar surface thereof, three additional flat planar surfaces.

11. A fuel injector as set forth in claim 9 wherein the lengths of said second sections of said terminals are non-parallel to the lengths of said first sections of said terminals.

12. A fuel injector as set forth in claim 1 wherein said electromagnetic coil assembly comprises a non-ferromagnetic bobbin on which said coil is disposed, and said bobbin comprises an end wall on which said terminals are mounted.

13. A fuel injector as set forth in claim 12 wherein substantially the entirety of said first section of each of said terminals is embedded in said end wall of said bobbin.

14. A fuel injector as set forth in claim 1 wherein an electrically conductive housing is disposed in at least partially enclosing relation to said electromagnetic coil assembly and comprises a circumferentially extending slot through which said terminals pass in non-contacting relation to said housing.

15. A fuel injector as set forth in claim 1 wherein said second section of each terminal comprises a flat planar surface, each terminal comprises first and second bends spaced apart along their respective lengths so as to render each terminal non-straight, each said first bend being closer than said second bend to said first section of its terminal, and said second section of each terminal being beyond its second bend relative to said first bend, that section of each terminal between its first and second bends containing a respective twist such that said flat planar surfaces of said second sections of said terminals are disposed in a common plane.

16. An electrically operated fuel injector for injecting fuel into an internal combustion engine comprising a fuel inlet tube via which fuel enters the fuel injector, a nozzle via which fuel is injected from the injector, an internal passage within said fuel injector for conveying fuel that has entered said fuel inlet tube to said nozzle, a mechanism comprising a solenoid-operated valve for selectively opening and closing said internal passage in accordance with selective energizing of an electromagnetic coil of an electromagnetic coil assembly that, in addition to said coil, comprises a pair of electrical terminals that form terminations for said coil and are spaced circumferentially from each other about said coil assembly, said fuel inlet tube comprising an inlet end containing an inlet opening for fuel to enter and a circular cylindrical side wall extending from said inlet end to pass into a central through-hole in said electromagnetic coil assembly, each of said pair of terminals being a length of formed metal having a first section of its length extending from said coil generally parallel to said circular cylindrical side wall of said fuel inlet tube and spaced slightly radially outwardly of said circular cylindrical side wall of said fuel inlet tube, each of said first sections of said terminals having a transverse cross section of a shape that provides each of said first sections with a flat planar surface that faces, and extends lengthwise parallel with, said circular cylindrical side wall of said fuel inlet tube, each of said pair of terminals further having a second section of its length spaced from its respective first section and adapted for making contact with a respective mating terminal for connecting the fuel injector to a control circuit for selectively energizing said coil wherein said surfaces of said first sections of said terminals that face said circular cylindrical side wall of said fuel inlet tube are disposed in respective imaginary planes each of which faces and is parallel to a respective diameter of said side wall of said fuel inlet tube, such respective diameters intersecting at an acute angle.

17. A fuel injector as set forth in claim 16 wherein said transverse cross section of each of said first sections of said terminals is rectangular in shape so that each first section of each terminal has, in addition to said surface thereof that faces said circular cylindrical side wall of said fuel inlet tube, three additional surfaces.

* * * * *